United States Patent [19]
Ricks

[11] Patent Number: 5,593,177
[45] Date of Patent: Jan. 14, 1997

[54] AIRBAG MODULE ELECTRIC COMPONENT ATTACHMENT USING STUDS

[75] Inventor: Merle Ricks, Layton, Utah

[73] Assignee: Morton International, Inc., Chicago, Ill.

[21] Appl. No.: 373,673

[22] Filed: Jan. 17, 1995

[51] Int. Cl.⁶ ................................................ B60R 21/16
[52] U.S. Cl. ............................ 280/731; 200/61.54
[58] Field of Search .................... 280/731, 735, 280/728.2; 200/61.54

[56] References Cited

U.S. PATENT DOCUMENTS

| | | | |
|---|---|---|---|
| 4,934,735 | 6/1990 | Embach | 280/731 |
| 5,085,461 | 2/1992 | Shibata | 280/731 |
| 5,219,415 | 6/1993 | Weinstein | 200/61.54 |
| 5,239,147 | 8/1993 | Allard et al. | 200/61.54 |
| 5,257,816 | 11/1993 | Sugimoto et al. | 280/731 |
| 5,269,559 | 12/1993 | Filion et al. | 280/728 |
| 5,283,404 | 2/1994 | Prescaro, Jr. | 200/61.54 |
| 5,331,125 | 7/1994 | Weinstein | 200/61.54 |
| 5,333,897 | 8/1994 | Landis et al. | 280/728 A |
| 5,333,900 | 8/1994 | Strahl | 280/731 |
| 5,346,248 | 9/1994 | Rhein et al. | 280/732 |
| 5,459,294 | 10/1995 | Danielson | 200/61.54 |

*Primary Examiner*—Paul N. Dickson
*Attorney, Agent, or Firm*—Gerald K. White

[57] ABSTRACT

An airbag module electric component attachment includes protruding studs existing on the airbag module and typically fastening the inflator, housing, cushion and cushion retainer together, and stud reception openings provided in the electric component in which the studs are secured when the electric component is pressed thereon.

8 Claims, 2 Drawing Sheets

AIRBAG MODULE ELECTRIC COMPONENT ATTACHMENT USING STUDS

BACKGROUND OF THE INVENTION

1. Field of the Invention

This invention relates to an improved method of and apparatus for attaching an electric component to an airbag module for a vehicle occupant restraint system.

2. Description of the Related Art

A typical airbag module is comprised of a housing in the form of a reaction plate, a folded airbag, an airbag inflator, and a rupturable decorative cover. Airbag modules also include electrical elements such as horn switch, redundant radio, cruise control and collision sensor. These electrical elements including the necessary electrical wiring are an integral part of the airbag module.

Airbag modules typically are manufactured at a facility that is distant from the final vehicle assembly plant. It is important, therefore, to protect the electrical elements and the electrical wiring during shipment and also during the process of incorporating the module into the steering unit of the vehicle. A separate plastic or metal member is normally employed to retain and protect the horn wiring. This member is in the form of a ring which encircles a circular inflator around which the wire is guided. The inflator is attached to the module housing by studs and nuts. The encircling ring includes integral clips for securing the wire to the ring and mounting holes for engaging the ring to the module. A ground connection for the wiring is also required which must be electrically connected into the vehicle chassis at the time the module is installed in the vehicle.

In U.S. Pat. No. 5,333,900 that was granted on Aug. 2, 1994 to Paul Strahl and Michael D. Frakes and is assigned to the assignee of the present invention and to the Chrysler Corporation, there is disclosed an airbag module electrical wiring improvement comprising a cover retainer for an airbag vehicle occupant restraint module including means formed integrally thereon for both retaining and securing the horn wires and providing a system of ground connection. The improvement comprises an electrically conductive retainer mounting two horn switches at spaced apart positions. The retainer is fabricated of one piece and has at least one tab formed thereon between the two horn switches and receives the horn wiring for positioning, securing and protecting the horn wiring. A terminal formed on the retainer receives a ground wire of the horn wiring. Thus mounting the retainer with the module to a grounded portion of the vehicle grounds the horn switches. The wiring improvement thus effected in the airbag module facilitates the assembly of the airbag module in the automotive vehicle. The wiring in the airbag module must be integrated with the wiring harness, that is, the complete wiring of the vehicle. Thus, there is a need for further improvement in the airbag module wiring to make easier rapid assemblage of the airbag module in the vehicle. The present invention was devised to fill the technological gap that has existed in the art in this respect.

SUMMARY OF THE INVENTION

An object of the invention is to provide a simple and effective way of attaching an electric component to an airbag module.

Another object of the invention is to provide an improved method of and apparatus using studs that are an integral part of an airbag module for the attachment to the airbag module of an electric component.

A further object of the invention is to simplify the construction and reduce the assembly time to an airbag module for an electric component which incorporates an electrically non-conductive circuit board.

The invention is concerned with the attachment of an electric component to a driver airbag module. In achieving the objectives of the invention, studs integral with or attached to the metallic housing of the airbag module are used to attach the electric component. The studs comprise electrically conductive engagement lugs and each one interacts with a respectively associated reception opening on the electric component. Assembly of the electric component to the airbag module is effected by positioning each of the electric component reception openings in axial alignment with a respectively associated stud. Pressing on the electric component causes the studs to be pushed into the matching reception openings. This is a quick means of attaching an electric component to the airbag module. The reception openings of the electric component can have an interference fit with the studs, which will provide a permanent retention of the electric component.

The invention may also include a clearance fit with the stud. A secondary component, for example, a nut, is assembled over the stud and traps the electric component onto the stud.

Another feature characterizing the invention is a planned electrical contact between the electrical component and the studs that attach the electrical component to the airbag module. The grounding of the electrical horn or controls is through the airbag module metal housing and vehicle steering wheel path to the vehicle chassis. This eliminates the need for a special ground wire connection to be provided by the manufacturer of the vehicle. Therefore, a single hot wire for the horn activation circuit can be attached to the electrical component. The grounding to complete the circuit is accomplished by the connection of the electrical component to the metal studs at the electrical component attachment location.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

DESCRIPTION OF THE PREFERRED EMBODIMENTS

Figure 1:
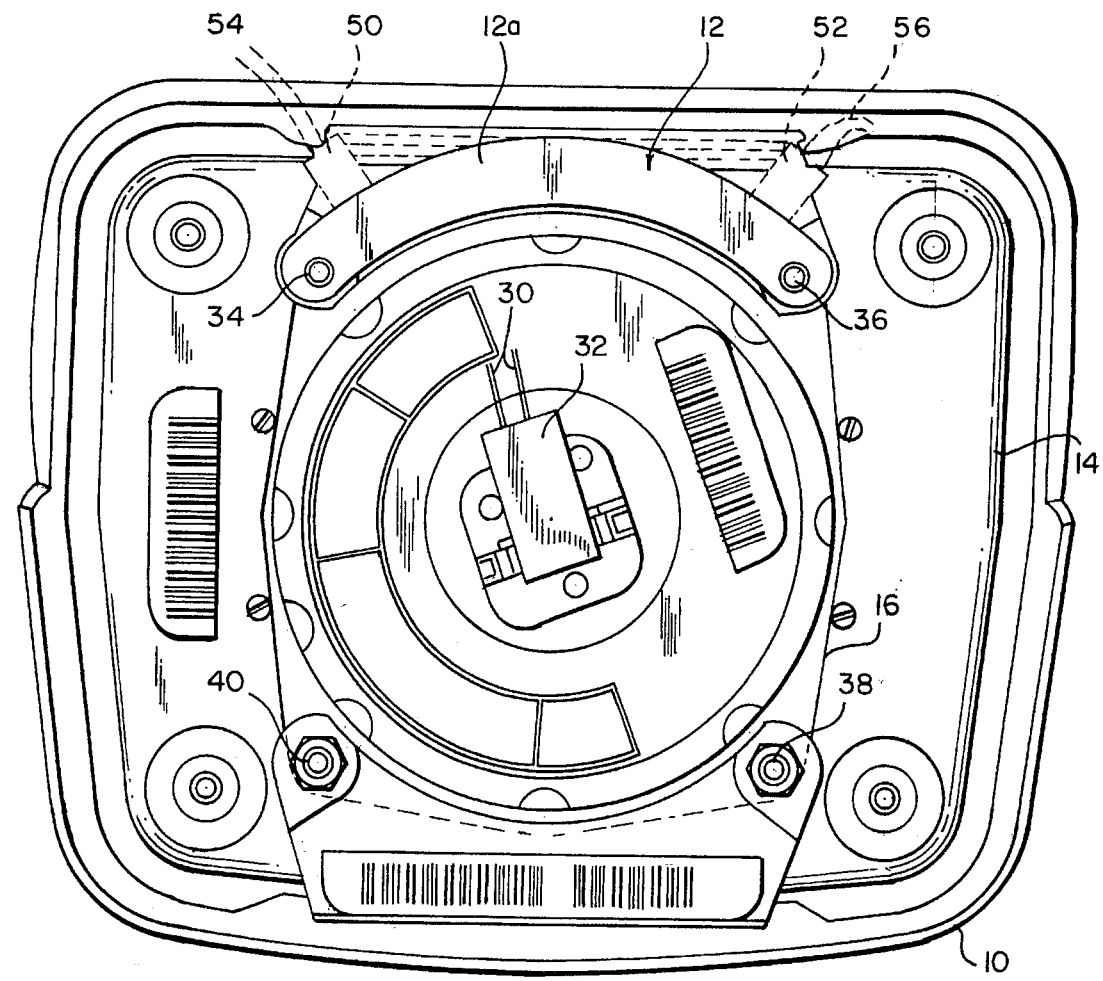
FIG. 1 is a back side view of an airbag module illustrating the permanent attachment, according to the invention, of an electric component comprising a horn switch circuit board to the airbag module using studs.
Figure 2:
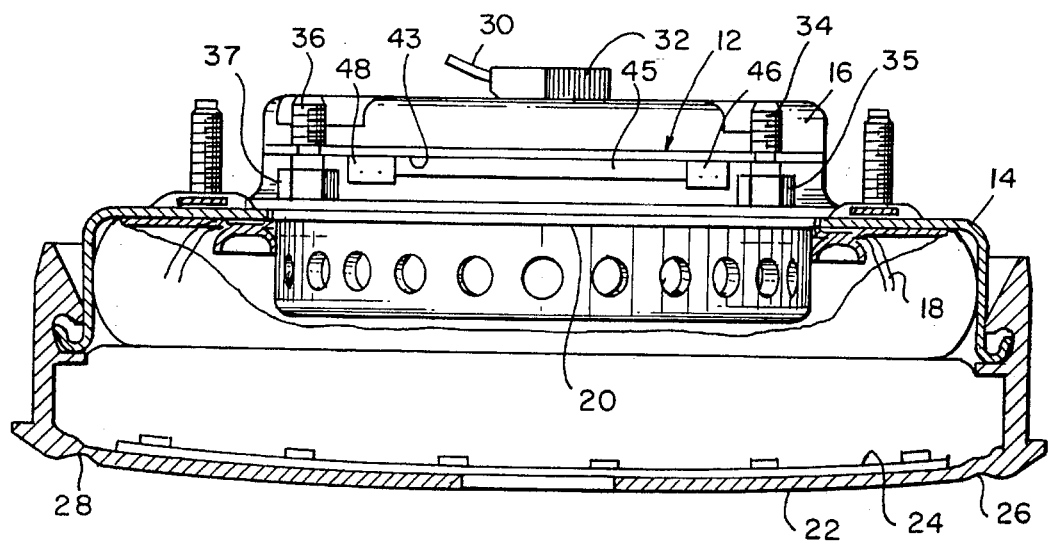
FIG. 2 is a partial side view of the airbag module shown in FIG. 1.

FIGS. 1 and 2 illustrate an airbag module 10 upon which is mounted, in accordance with the invention, an elongated electric component such, for example, as a curved horn switch circuit board 12.

The airbag module 10 is comprised of a housing 14 in the form of a reaction plate, an inflator 16 which at the back side of the module 10 is generally circularly shaped and contains rapid burning gas generant, a folded airbag or cushion 18, a cushion retaining ring 20, and a rupturable decorative cover 22 in which a bend sensor 24 is suitably mounted. The cover 22 includes designed tear seams 26 and 28 that permit the cover 22 to open upon airbag pressurization from rapidly burning gas generant in the inflator 16 upon initiation of operation of the module 10. Initiation of operation of module 10 is produced by an electrical signal produced by a vehicle collision sensor (not shown), which signal is applied by wires 30 to a squib connector 32 that is attached to the inflator 16.

The electric component 12 includes a support body 12a made of suitable conventional electrical circuit board material and is designed so that it can be quickly attached to the back side of the module 10 without the use or need for additional fasteners. Spaced studs 34 and 36 that are uniformly positioned at the back side of the module 10 with respect to the circularity of the inflator 16 are used to attach the electric component 12 to the module 10. Spaced reception openings 42 and 44 of the electric component 12 have an interference fit with the studs 34 and 36 which will provide a permanent retention of the electric component 12.

Studs 34 and 36 and additional studs 38 and 40 shown in FIG. 1 are 6 mm studs. These studs 34, 36, 38 and 40 are all electrically conductive and exist in the design of the airbag module 10. By means of respective cooperating nuts 35, 37, 39 and 41, these studs fasten the inflator 16, housing 14, cushion 18 and cushion retaining ring 20 together. All of the studs protrude from the back side of the airbag module 10.

The electric component 12 is assembled to the airbag module 10 by pushing it onto the studs 34 and 36. The studs 34 and 36 engage the electrical component 12 spaced stud reception openings 42 and 44 that are provided therein. The design, that is, the size and shape of the reception openings 42 and 44 is such that an interference fit is established that securely attaches the electric component 12 to the airbag module 10. This attachment is secure throughout the typical environments to which the airbag module 10 is subjected during the life thereof in the vehicle in which it is installed.

Figure 3:
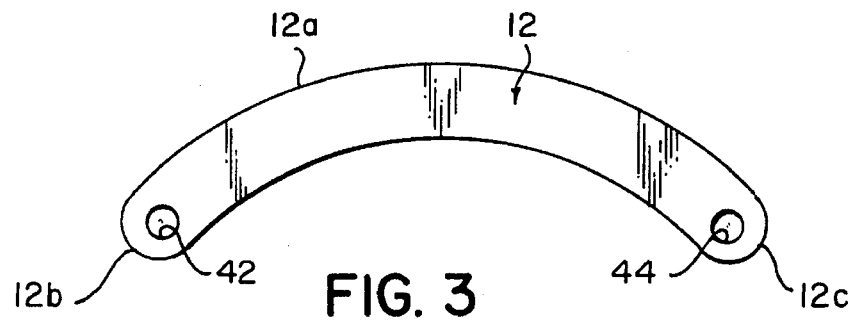
FIG. 3 is a view of the electrical component comprising a horn switch circuit board.

The electric component 12, as shown in FIGS. 1 and 3, is curved, that is, it is arcuate in shape, and has a first end 12b and a second end 12c with reception opening 42 positioned adjacent the first end 12b and the reception opening 44 positioned adjacent the second end 12c. Being arcuate in shape with a curvature the rate of change of which is less than that of the inflator 16, the component 12 partially encircles the circular inflator 16 with the first and second ends 12b and 12c adjacent respectively associated studs 34 and 36 that protrude from the back of the module 10.

Provided on the surface 43 of the electric component 12 are surface mounted electrical elements 45 including resistors, capacitors, etc. Mounted on the extremities of the electric component 12 adjacent respectively associated reception openings 42 and 44 are electrical connectors 46 and 48 which include female contacts or terminals that mate with the protruding pins of respectively associated plug-in electrical connectors 50 and 52 to which, respectively, are attached wires 54 and 56. The electrical connectors 50 and 52 are shown in dotted outline since they are provided by the vehicle manufacturer together with the electrical wires 54 and 56 that are connected thereto. Electrical connector 46 is a vehicle ground and horn switch relay connector. Plug-in electrical connector 50 and attached wires 54 provide a ground wire connection for this purpose. Electrical connector 48 is a connector to a resistance switch.

The electrical component 12 is used to control the bend sensor 24 in the module cover 22 using a resistance type methodology. Bending of the bend sensor 24 in the module cover 22 changes the electric component 12.

As those skilled in the art will understand, instead of providing an interference fit with the studs 34 and 36 upon which the electric component 12 is pushed, the reception openings 42 and 44 may be so sized as to provide a clearance fit with the studs. A secondary component such as a nut similar to the nuts 35, 37, 39 and 41 may be assembled over the studs 34 and 36 to trap the electric component 12 thereon.

Figure 4:
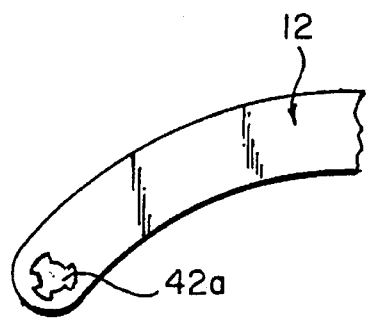
FIG. 4 is a fragmented view illustrating an alternate cloverleaf shaped electric component reception opening.

An alternate shape for the attachment reception openings 42 and 44 that may be provided in the electric component 12 for attachment to the respectively associated studs 34 and 36 is illustrated in FIG. 4. The reception opening 42a shown in FIG. 4 has a cloverleaf shape with three spaced areas of contact engagement with the stud.

Figure 5:
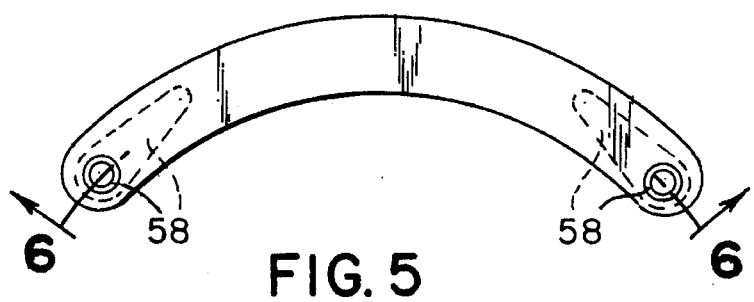
FIG. 5 is a view of the electrical component showing an electrically conductive wire, conductor or path associated therewith for facilitating the establishment of a grounded connection thereto.
Figure 6:
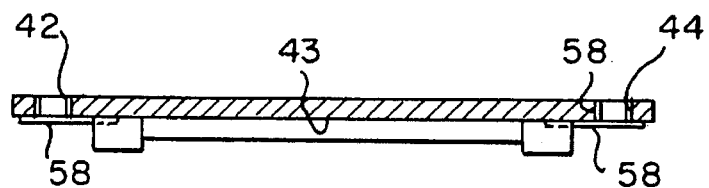
FIG. 6 is a cross sectional view taken along lines 6—6 of FIG. 5.

Another feature of the invention is the provision of an electrical contact between the circuit board of the electrical component and the mounting studs. This electrical contact is achieved, as shown in FIGS. 5 and 6, by the attachment or deposition, as by a suitable printed circuit technique, on the surface 43 of the electrical component 12 of a wire, conductor or path 58 of good electrical conductivity. Conductor 58 extends along a portion, at least, of the surface 43 of the electrical component 12 and surrounds, that is, encircles one or the other or both of the receptive openings 42 and 44 as well as the inner wall surface of each receptive opening involved. A suitable connection (not shown) is provided in a manner known to those skilled in the art between the conductor 58 and the electrical elements of the electrical component 12.

The grounding of the conductor 58 and thereby of the electrical component 12 is through the metal housing of the airbag module 10, and the vehicle steering wheel path to the vehicle chassis. This eliminates the need for a ground wire connection on the male plug electrical connector 50 and attached wires 54 shown in FIG. 1, which are provided by the vehicle manufacturer. As a result, a single hot wire for the horn activation circuit could be attached to the horn switch circuit board. The grounding to complete the circuit is accomplished by the connection of the circuit board of the metal stud 34 or 36 at the circuit board attachment location.

Thus, in accordance with the invent ion there has been provided an improved method of attachment of an electric component to an airbag module. The invention has also simplified the construction and reduced the assembly time for the attachment to an airbag module of an electric component such as a horn switch assembly which incorporates a circuit board.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims and their equivalents.

What is claimed is:

1. In a driver's side vehicle occupant restraint module of the type including an inflator, a housing, and a folded cushion that are fastened together by spaced studs, said module having a back side from which said spaced studs protrude, the improvement comprising an electric component having a first end and a second end, said electric component having at least one of said first and second ends mounted on one of said studs, said electrical component having mounted thereon a first female electrical connector to which a plug-in electrical connector may be attached, wherein said electric component is elongated and includes stud reception openings adjacent the extremities thereof, wherein said electric component is assembled to said module by positioning said reception openings adjacent said spaced studs and pushing said electric component onto said spaced studs, said spaced studs engaging through said reception openings with the size of said reception openings being such that an interference fit is established that securely attaches said electric component to said module, wherein, at the back side of said module, said inflator is generally circular, wherein said spaced studs are uniformly positioned with respect to the circularity of said inflator, and wherein said electric component is curved with a curvature the rate of change of which is less than that of said inflator whereby said electric component partially encircles said inflator in a generally coaxial relationship for a substantial angle.

2. The improvement of claim 1 wherein said electric component partially encircles said inflator for an angle of about 90°.

3. In a driver's side vehicle occupant restraint module of the type including an inflator, a housing, and a folded cushion that are fastened together by spaced studs, said module having a back side from which said spaced studs protrude, the improvement comprising an electric component having a first end and a second end, said electric component having at least one of said first and second ends mounted on one of said studs, said electrical component having mounted thereon a first female electrical connector to which a plug-in electrical conector may be attached, wherein said electric component is mounted on said first end and on said second end on a respectively associated one of said spaced studs, wherein said first electrical connector is mounted adjacent said first end of said electric component, and further including a second female electrical connector mounted adjacent said second end of said electric component.

4. In a driver's side vehicle occupant restraint module of the type including an inflator, a housing, and a folded cushion that are fastened together by spaced studs, said module having a back side from which said spaced studs protrude, the improvement comprising an electric component having a first end and a second end, said electric component having at least one of said first and second ends mounted on one of said studs, said electrical component having mounted thereon a first female electrical connector to which a plug-in electrical connector may be attached, wherein said electric component is elongated and includes stud reception openings adjacent the extremities thereof, wherein said electric component is assembled to said module by positioning said reception openings adjacent said spaced studs and pushing said electric component onto said spaced studs, said spaced studs engaging through said reception openings with the size of said reception openings being such that an interference fit is established that securely attaches said electric component to said module, wherein said vehicle occupant restraint module includes a metal housing, wherein said electrical component includes a support body comprising an electrically non-conductive circuit board, wherein at least one of said studs is electrically conductive, and further including an electrically conductive path on said electrically non-conductive circuit board between said electrical component and said electrically conductive stud, whereby mounting of said electrical component on said studs effects a connection of said electrical component to said airbag module metal housing.

5. The improvement of claim 4 wherein said spaced studs are electrically conductive, and wherein an electrically conductive wire conductor or path is included between said electrical component and both of said studs.

6. The improvement of claim 4 wherein said electrically conductive path is formed on a side of said support body circuit board that is adjacent said electrical component.

7. The improvement of claim 4 wherein said electrically conductive path encircles at least the reception opening of said circuit board that is associated with said electrically conductive stud and also the inner wall surface of the said associated reception opening.

8. In a driver's side vehicle occupant restraint module of the type including an inflator, a housing, and a folded cushion that are fastened together by spaced studs, said module having a back side from which said spaced studs protrude, the improvement comprising an electric component having a first end and a second end said electric component having at least one of said first and second ends mounted on one of said studs, said electrical component having mounted thereon a first female electrical connector to which a plug-in electrical connector may be attached, wherein said electric component is elongated and includes stud reception openings adjacent the extremities thereof, wherein said electric component is assembled to said module by positioning said reception openings adjacent said spaced studs and pushing said electric component onto said spaced studs, said spaced studs engaging through said reception openings with the size of said reception openings being such that an interference fit is established that securely attaches said electric component to said module, wherein, at the back side of said module, said inflator is generally circular, wherein said spaced studs are uniformly positioned with respect to the circularity of said inflator, and wherein said electric component is curved with a curvature the rate of change of which is less than that of said inflator whereby said electric component partially encircles said inflator in a generally coaxial relationship for a substantial angle, wherein said electric component partially encircles said inflator for an angle of about 90°, wherein said electric component is mounted on said first end and on said second end on a respectively associated one of said spaced studs, wherein said first electrical connector is mounted adjacent said first end of said electric component, and further including a second female electrical connector mounted adjacent said second end of said electric component to which another plug-in electrical connector may be attached.

* * * * *

UNITED STATES PATENT AND TRADEMARK OFFICE
CERTIFICATE OF CORRECTION

PATENT NO. : 5,593,177
DATED : January 14, 1997
INVENTOR(S) : Merle Ricks

It is certified that error appears in the above-indentified patent and that said Letters Patent is hereby corrected as shown below:

Col. 6, Ln. 48, correct "end said" to read -- end, said -- .

Signed and Sealed this

Eighteenth Day of November 1997

Attest:

BRUCE LEHMAN

Attesting Officer

Commissioner of Patents and Trademarks